US010298316B2

(12) United States Patent
Scott

(10) Patent No.: US 10,298,316 B2
(45) Date of Patent: *May 21, 2019

(54) METHOD AND APPARATUS FOR ROUTING IP PACKETS IN MULTI-BEAM SATELLITE NETWORKS

(71) Applicant: The Boeing Company, Chicago, IL (US)

(72) Inventor: James P. Scott, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,433

(22) Filed: Jan. 27, 2017

(65) Prior Publication Data
US 2017/0141840 A1    May 18, 2017

Related U.S. Application Data

(63) Continuation of application No. 13/633,258, filed on Oct. 2, 2012, now Pat. No. 9,596,022.

(51) Int. Cl.
*H04B 7/185* (2006.01)
*H04L 12/933* (2013.01)

(52) U.S. Cl.
CPC ..... *H04B 7/18515* (2013.01); *H04L 49/1569* (2013.01)

(58) Field of Classification Search
CPC .................................. H04B 7/18515
See application file for complete search history.

(56) References Cited

U.S. PATENT DOCUMENTS

| 4,381,562 A | 4/1983 | Acampora |
| 4,425,639 A | 1/1984 | Acampora et al. |
| 6,574,794 B1 | 6/2003 | Sarraf |

(Continued)

FOREIGN PATENT DOCUMENTS

| CN | 1768495 A | 5/2006 |
| CN | 101635594 A | 1/2010 |
| WO | 2004073229 A2 | 8/2004 |

OTHER PUBLICATIONS

China Office Action for related application 2013104495795 dated Aug. 16, 2017; 7 pp.

(Continued)

*Primary Examiner* — Timothy J Weidner
*Assistant Examiner* — Debebe A Asefa
(74) *Attorney, Agent, or Firm* — Armstrong Teasdale LLP

(57) ABSTRACT

An example system for satellite payload communications includes a digital channelizer and a regenerative communications subsystem (RCS). The digital channelizer includes a plurality of inputs for receiving a plurality of signals from a plurality of uplink beams and a plurality of outputs for outputting the plurality of signals. The RCS includes a plurality of inputs selectably coupled to the digital channelizer outputs to receive signals from selected ones of the digital channelizer outputs and a plurality of outputs selectably coupled to the digital channelizer inputs to transmit the processed signals to selected ones of the digital channelizer inputs. The RCS is configured to process selected ones of the plurality of signals to produce processed signals.

20 Claims, 3 Drawing Sheets

(56) References Cited

U.S. PATENT DOCUMENTS

| | | | |
|---|---|---|---|
| 7,542,716 B2 * | 6/2009 | Bell | H04B 7/18515 |
| | | | 455/3.02 |
| 8,064,920 B2 | 11/2011 | Bell et al. | |
| 8,194,582 B2 | 6/2012 | Scott | |
| 8,218,476 B2 * | 7/2012 | Miller | H04B 7/2041 |
| | | | 370/321 |
| 2011/0268017 A1 | 11/2011 | Miller | |

OTHER PUBLICATIONS

European Search Report issued in related EP Patent Application No. EP 13181952, dated Oct. 14, 2013, 4 pages.
Wood, Lloyd, "CLEO Cisco Router in Low Earth Orbit," Cisco Systems, Jul. 2006, ISU Summer Session, Strasbourg; 31 pp.

* cited by examiner

METHOD AND APPARATUS FOR ROUTING IP PACKETS IN MULTI-BEAM SATELLITE NETWORKS

CROSS-REFERENCE TO RELATED APPLICATIONS

This application is a continuation and claims priority to U.S. patent application Ser. No. 13/633,258 filed Oct. 2, 2012 for "METHOD AND APPARATUS FOR ROUTING IP PACKETS IN MULTI-BEAM SATELLITE NETWORKS", which is hereby incorporated by reference in its entirety.

BACKGROUND

The field of the disclosure relates generally to satellite communications, and more particularly relates to methods and apparatus for routing Internet Protocol (IP) packets in a satellite network.

A typical modern transponded (or "bent-pipe") satellite has a metal or composite frame that houses a power source (e.g., one or more batteries, solar cells, and/or the like) and various electronic components, as well as one or more antennas. The components generally include one or more "transponders" that contain one or more radio receivers, frequency translators, and/or transmitters. The total bandwidth of the satellite is based on the number of transponders. For example, one known commercially-available satellite has a total available bandwidth of 3,528 MHz divided across forty-five C-band and sixteen Ku-band transponders. Such transponders are collectively referred to as "the payload" of the satellite.

A typical analog transponded communications payload receives multiple uplink beams from the earth or another satellite via an uplink antenna. Each received beam is amplified with a low noise amplifier (LNA) and downconverted (D/C) for additional processing. The down-converted beams can then be switched, multiplexed (MUX) or otherwise routed and combined prior to upconversion and re-transmission to the Earth or another satellite.

Digital satellite payloads generally function in either a channelized manner or a regenerative manner. A channelized payload emulates traditional fixed analog transponders, but also includes the ability to finely divide, control, and monitor bandwidth and power allocation onboard the satellite. Digital transponded payloads normally have flexible switching of inputs to outputs. Transponded channels are merely repeated signals, without any modification. Accordingly, transponder payloads can carry any type of signal without regard to format or modulation mode. Digital transponder systems may be relatively easily modified to be backward compatible with analog transponder systems. Unlike transponded payloads, regenerative payloads can perform demodulation and remodulation of uplinked signals. In such systems, the user signal and the user data embedded in the signal are recovered and processed to enable the payload to act upon the user data in a desired manner. Embedded data has historically been used for autonomous switching in packet or frame-based systems and/or for security functions. In particular, error detection and correction can be performed on the embedded data before it is retransmitted. However, because of their requirements for specific signal and data types, regenerative systems are generally not backward compatible.

BRIEF DESCRIPTION

According to one aspect of the present disclosure, an example system for satellite payload communications includes a digital channelizer and a regenerative communications subsystem (RCS). The digital channelizer includes a plurality of inputs for receiving a plurality of signals from a plurality of uplink beams and a plurality of outputs for outputting the plurality of signals to a plurality of downlink beams. The RCS includes a plurality of inputs selectably coupled to the digital channelizer outputs to receive signals from the digital channelizer outputs and a plurality of outputs selectably coupled to the digital channelizer inputs to transmit the processed signals to the digital channelizer inputs. The RCS is configured to process selected signals of the plurality of signals from the plurality of uplink beams to produce processed signals to the plurality of signals sent to the plurality of downlink beams.

Another aspect of the present disclosure is a method for use in satellite communications. The method includes receiving a plurality of signals from an uplink beam, providing the plurality of signals to a plurality of inputs of a digital channelizer including a plurality of outputs, providing output signals from at least one of the digital channelizer outputs to a regenerative communications subsystem (RCS), and providing processed signals from the RCS to at least one of the digital channelizer inputs, to allow the processed signals to be switched by the digital channelizer to a plurality of signals for a downlink beam.

Yet another aspect of the present disclosure is a system for satellite payload communications. The system includes a channelizer, a regenerative communication subsystem (RCS), and a controller. The channelizer includes a plurality of inputs and a plurality of outputs. The plurality of inputs is configured to receive signals from a plurality of uplink beams. The plurality of outputs is configured to couple output signals to a plurality of downlink beams. The RCS includes a plurality of inputs and a plurality of outputs. Each of the plurality of RCS outputs is coupled to a different one of the channelizer inputs. The RCS is configured to regeneratively process signals received at its inputs and to output processed signals via its outputs. The controller is configured to selectively switch output signals of one or more of the channelizer outputs from the downlink beams to one or more of the RCS inputs.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The exemplary methods and systems described herein relate to satellite-based communications. More particularly the exemplary embodiments described herein facilitate efficient routing of Internet protocol (IP) packets in a multi-beam satellite network environment. The methods and systems described herein generally combine a channelizer-based satellite payload and a digital-regenerative communications system. One or more of the outputs of the channelizer are directed to the regenerative communications system for processing and output back to the channelizer as IP packets. The resulting systems may facilitate reducing the number of satellite hops needed to deliver data, and thus reduce the delay in the transmission of signals, while improving the quality of service for users. Moreover, the described methods and apparatus provide a relatively low cost, incremental approach to providing regenerative systems in a satellite network. Furthermore, the reduced satellite hops may enable packet-based networks that span multiple satellite beams to be more responsive to failures because of the reduced delay in resynchronizing routing databases across the network.

Figure 1:
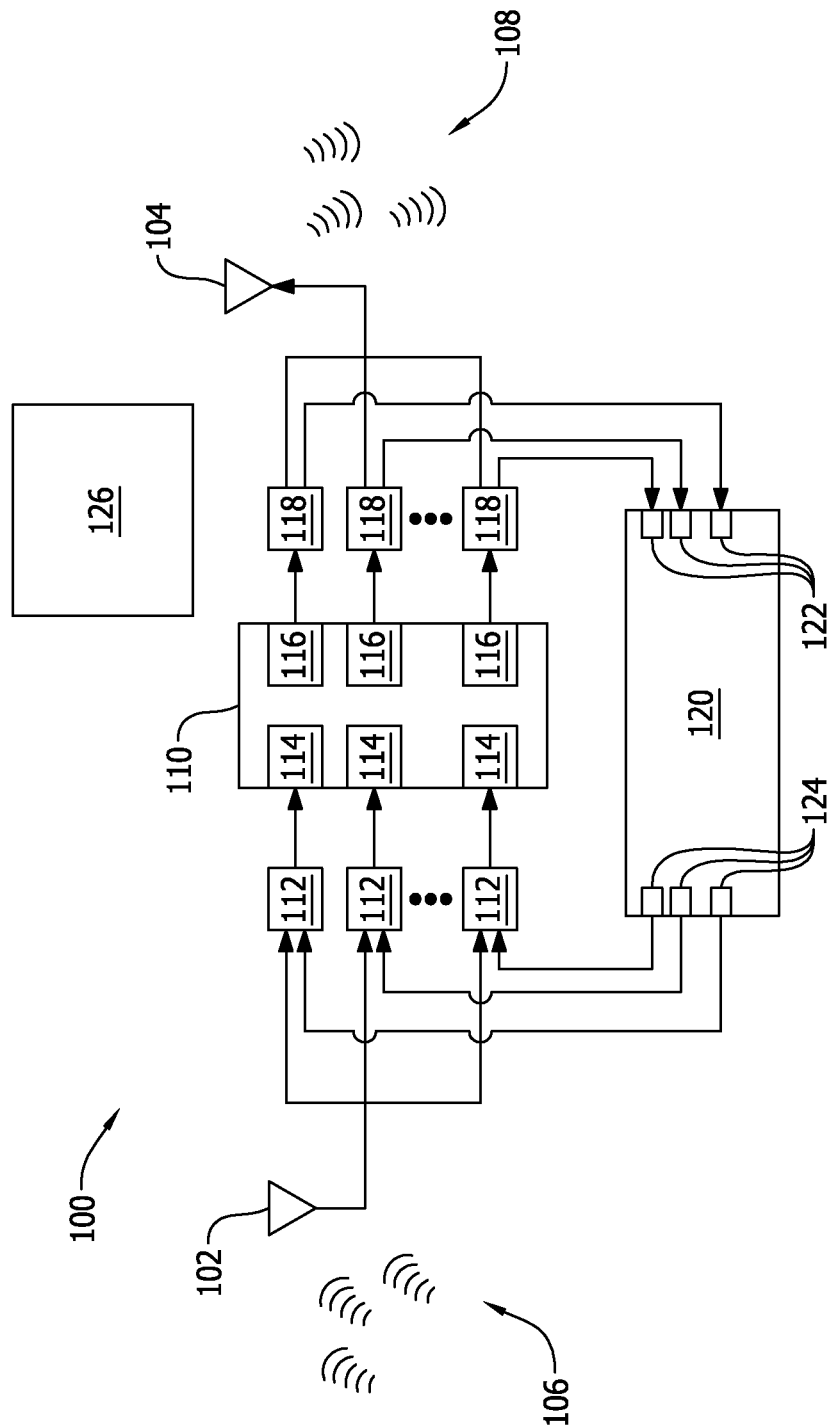
FIG. 1 is a block diagram of an exemplary satellite system.

Referring more particularly to the drawings, FIG. 1 is a block diagram of an exemplary satellite communications system 100. In the exemplary embodiment, satellite communications system 100 includes an uplink antenna 102 and a downlink antenna 104. Uplink antenna 102 receives uplink beams 106 from one or more terrestrial sources (not shown) and/or from other satellites (not shown). Downlink antenna 104 transmits downlink beams 108 to one or more terrestrial sources (not shown) and/or to other satellites (not shown). Although only a single uplink antenna 102 and a single downlink antenna 104 are illustrated in FIG. 1, communications satellite 100 may include any suitable number of uplink and downlink antennas 102 and 104.

Uplink beams 106 are filtered, amplified, and down-converted by satellite communications system 100. The resulting signals are provided to a channelizer 110 via a plurality of selectors 112. A different one of the uplink beams 106 may be coupled to each of selectors 112. Selectors 112 selectively provide one of their two selector inputs to a channelizer input 114 of channelizer 110. In other embodiments, selectors 112 may include more than two selector inputs. Channelizer 110 digitally divides each subband of the input signals into frequency slices that can be separately, switched, processed, routed, and/or recombined in output subbands provided to channelizer outputs 116. In other embodiments, input signals are switched and multiplexed without additional processing. Although three channelizer inputs 114 and three channelizer outputs 116 are illustrated in FIG. 1, channelizer 110 may include any suitable number of channelizer inputs 114 and channelizer outputs 116.

Switches 118 are coupled to channelizer outputs 116. Each of switches 118 may be configured to receive signals from a different one of the channelizer outputs 116. Switches 118 selectively provide the output signals from channelizer 110 to downlink antenna 104 or to a regenerative communications sub-assembly (RCS) 120. RCS 120 includes RCS inputs 122 for receiving output signals from channelizer 110. RCS 120 performs any suitable regenerative processing on the output signals from channelizer 110. For example, in one embodiment, RCS 120 demodulates the signals and accesses data stored therein. In some embodiments, the data is used for IP packet-routing, cryptographic security and authentication, session establishment for voice and data services, error detection, and/or correction. After Processing the data embedded in the output signals provided to RCS 120 by switches 118, the data is remodulated and output to selectors 112 via RCS outputs 124.

Output signals from RCS 120 are coupled into channelizer 110 through selectors 112. For example, each of the selectors 112 may be coupled to a respective RCS output 124, one of the uplink beams 106, and to one of the channelizer inputs 114. More specifically, the RCS output signals are handled by channelizer 110 in the same manner described above for signals from uplink beams 106 and routed to switches 118 for delivery to downlink antenna 104.

In the exemplary embodiment, satellite 100 includes a controller 126. Controller 126 controls operation of switches 118, selectors 112, channelizer 110, and RCS 120 in the manner described herein. Although illustrated as a single, discrete controller, satellite communications system 100 may include multiple, separate controllers 126. For example, RCS 120 may include one or more controllers 126, channelizer 110 may include one or more controllers 126, etc. Controller 126 may be any other suitable analog and/or digital controller used to control operation of satellite communications system 100 as described herein.

Figure 2:
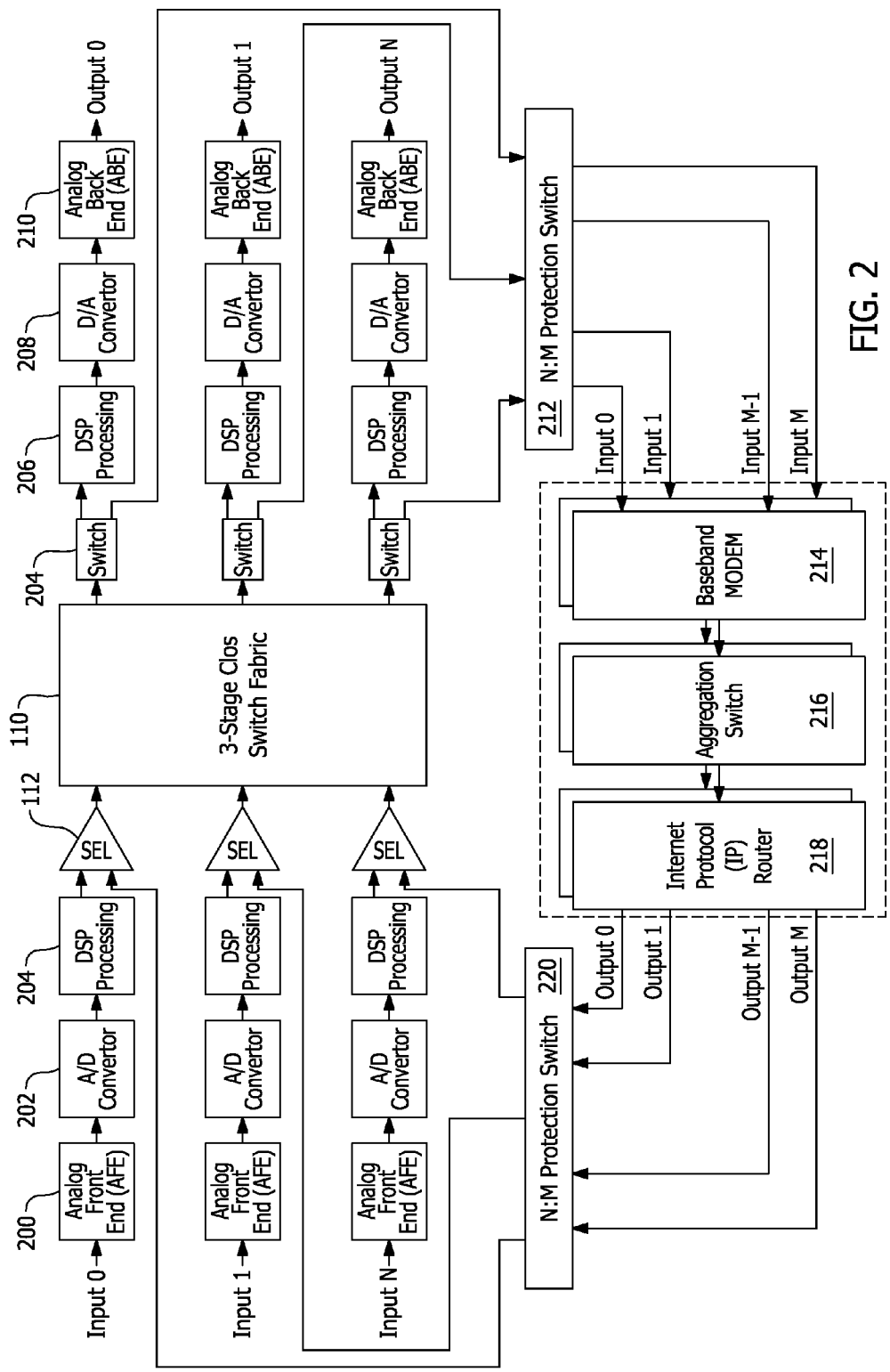
FIG. 2 is a block diagram of an exemplary payload that may be used in the satellite system shown in FIG. 1.

FIG. 2 is a block diagram of an alternative embodiment of satellite communications system 100. In this embodiment, uplink beams 106 are processed by an analog front end 200, and analog-to-digital converter 202, and digital signal processor 204 prior to signals being routed to channelizer 110 via selectors 112. The digital output signals from channelizer 110 that are not switched to RSC 120 are processed by a DSP processor 206, a digital-to-analog converter 208, and an analog back end 210 prior to transmission to downlink antenna 104. The signals switched to RSC 120 are coupled to RSC 120 via a protection switch 212. In the exemplary embodiment protection switch 212 is an N:M protection switch providing redundancy within system 100. In other embodiments, any other suitable type of protection switch may be used.

In this embodiment, RCS 120 includes a baseband modem 214, an aggregation switch 216, and an IP router 218. The aggregation switch 216 may be coupled between the IP router 218 and at least one of the RCS 120 inputs. The baseband modem 214 may be coupled between the aggregation switch 216 and at least one of the RCS 120 inputs. Baseband modem 214 includes inputs 122 to receive the signals from channelizer 110 and outputs baseband signals to aggregation switch 216. Aggregation switch 216 aggregates packet traffic to/from unidirectional downlink/uplink beams and presents the aggregate traffic to the bidirectional interfaces of the IP router 218. IP router 218 routes the processed signals through outputs 124. The processed signals output from RSC 120 are provided to selectors 112 via a protection switch 220. In the exemplary embodiment protection switch 220 is an N:M protection switch providing redundancy within system 100. In other embodiments, any other suitable type of protection switch may be used.

Figure 3:
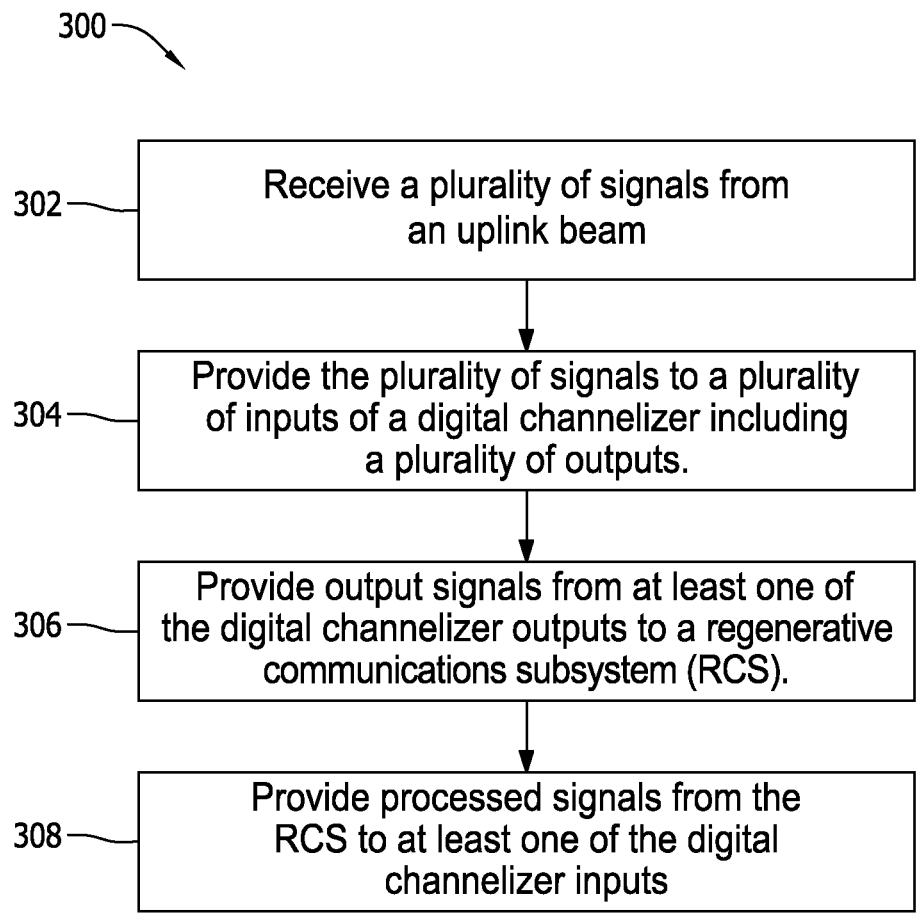
FIG. 3 is a flow diagram of an exemplary method of operating the system and payload of FIGS. 1 and 2.

FIG. 3 is a flow diagram of an exemplary method 300 of operating a system and payload, such as system 100. Method 300 includes receiving 302 a plurality of signals from an uplink beam. The plurality of signals are provided 304 to a plurality of inputs of a digital channelizer including a plurality of outputs. Output signals from at least one of the digital channelizer outputs are provided 306 to a regenerative communications subsystem (RCS). Processed signals from the RCS are provided 308 to at least one of the digital channelizer inputs.

The exemplary methods and systems described herein facilitate an efficient routing of IETF-standard Internet protocol (IP) packets in a multi-beam satellite network environment, allowing for the design of IP-based networks that span multiple satellite beams (or earth coverage areas). The resulting systems facilitate reducing the number of satellite hops needed to deliver data, thereby reducing delay in the transmission of signals and improving quality of service for users. Moreover, embodiments described herein provide a relatively low cost, incremental approach to providing regenerative systems in a satellite network. Furthermore, the reduced satellite hop may allow packet based networks that span multiple satellite beams to be more responsive to failures because the inclusion of the satellite node as a routing peer in the IP network topology enables reduced delay in resynchronizing routing databases across the network.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated. This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in satellite communications, said method comprising:
   operating a plurality of selectors to provide a plurality of signals to a plurality of inputs of a digital channelizer;
   operating a switch to selectively provide at least one output signal from an output of the digital channelizer to a regenerative communications subsystem (RCS), wherein the RCS processes the at least one output signal to form at least one processed signal; and
   operating at least one selector of the plurality of selectors to provide the at least one processed signal from the RCS to at least one input of the digital channelizer.

2. The method in accordance with claim 1, wherein operating a switch comprises selecting a first output of the digital channelizer to be communicatively coupled to the RCS.

3. The method in accordance with claim 2 further comprising operating the switch to provide downlink beam signals from a second output of the digital channelizer that was not selected to be communicatively coupled to the RCS.

4. The method in accordance with claim 1, wherein operating at least one selector comprises operating the at least one selector to provide the at least one processed signal and a signal received from an uplink beam to the digital channelizer.

5. The method in accordance with claim 1 further comprising operating the RCS to regeneratively process the at least one output signal to form the at least one processed signal.

6. A system for providing satellite payload communications with a plurality of selectors, a digital channelizer, a switch, and a regenerative communications subsystem (RCS), said system comprising:
   a controller configured to:
      operate the plurality of selectors to provide a plurality of signals to a plurality of inputs of the digital channelizer;
      operate the switch to selectively provide at least one output signal from an output of the digital channelizer to the RCS, wherein the RCS processes the at least one output signal to form at least one processed signal; and
      operate at least one selector of the plurality of selectors to provide the at least one processed signal from the RCS to at least one input of the digital channelizer.

7. The system in accordance with claim 6, wherein said controller is further configured to select a first output of the digital channelizer to be communicatively coupled to the RCS.

8. The system in accordance with claim 7, wherein said controller is further configured to operate the switch to provide downlink beam signals from a second output of the digital channelizer that was not selected to be communicatively coupled to the RCS.

9. The system in accordance with claim 6, wherein said controller is further configured to operate the at least one selector to provide the at least one processed signal and a signal received from an uplink beam to the digital channelizer.

10. The system in accordance with claim 6, wherein said controller is further configured to operate the RCS to regeneratively process the at least one output signal to form the at least one processed signal.

11. The system in accordance with claim 6, wherein said controller is one of an analog controller or a digital controller.

12. A system for satellite payload communications, said system comprising:
   a channelizer comprising a plurality of inputs and a plurality of outputs, the plurality of inputs configured to receive signals from a plurality of uplink beams, the plurality of outputs configured to couple output signals to a plurality of downlink beams;
   a regenerative communication subsystem (RCS) comprising a plurality of inputs and a plurality of outputs, each of the plurality of RCS outputs coupled to a different one of said channelizer inputs, said RCS configured to regeneratively process signals received at its inputs and to output processed signals via its outputs;
   a plurality of switches coupled to said channelizer, each one of said output switches configured to receive signals from a different one of said channelizer outputs; and
   a controller configured to control operation of said plurality of switches such that output signals of one or more of said channelizer outputs is provided from the downlink beams to one or more of said RCS inputs.

13. The system in accordance with claim 12 further comprising a plurality of selectors, each selector coupled to a different one of said RCS outputs and a different one of said channelizer inputs.

14. The system in accordance with claim 13, wherein said controller is further configured to control operation of said plurality of selectors such that signals from the uplink beams or processed signals from said RCS are selectively provided to said channelizer inputs.

15. The system in accordance with claim 12, wherein said controller is one of an analog controller or a digital controller.

16. The system in accordance with claim 12, wherein said controller is a single, discrete controller.

17. The system in accordance with claim 12, wherein said controller comprises one or more controllers included in said RCS.

18. The system in accordance with claim 17, wherein said controller comprises one or more controllers included in said channelizer.

19. The system in accordance with claim 12, wherein said RCS comprises a baseband modem coupled to the plurality of RCS inputs, an IP Router coupled to said channelizer inputs, and an aggregation switch coupled between the baseband modem and the IP router.

20. The system in accordance with claim 12, wherein the processed signals comprise internet protocol packets.

* * * * *